United States Patent [19]

Yamamuro et al.

[11] Patent Number: 4,908,610
[45] Date of Patent: Mar. 13, 1990

[54] COLOR IMAGE DISPLAY APPARATUS WITH COLOR PALETTE BEFORE FRAME MEMORY

[75] Inventors: Takahiko Yamamuro; Nobuo Fukushima, both of Nagasaki, Japan

[73] Assignee: Mitsubishi Denki Kabushiki Kaisha, Tokyo, Japan

[21] Appl. No.: 249,111

[22] Filed: Sep. 26, 1988

[30] Foreign Application Priority Data

Sep. 28, 1987 [JP] Japan ............................... 62-243064
Sep. 28, 1987 [JP] Japan ............................... 62-243065

[51] Int. Cl.⁴ .............................................. G09G 3/16
[52] U.S. Cl. ..................................... 340/703; 340/799
[58] Field of Search .................... 358/75, 78; 340/703, 340/701, 799, 750

[56] References Cited

U.S. PATENT DOCUMENTS

| Re. 32,201 | 7/1986 | Bradley | 340/703 X |
|---|---|---|---|
| 4,200,867 | 4/1980 | Hill | 340/703 |
| 4,591,842 | 5/1986 | Clarke, Jr. et al. | 340/703 X |
| 4,608,596 | 8/1986 | Williams | 340/703 X |
| 4,689,669 | 8/1987 | Hoshino et al. | 358/78 X |
| 4,700,181 | 10/1987 | Maine et al. | 340/747 |
| 4,725,831 | 2/1988 | Coleman | 340/747 |
| 4,731,742 | 3/1988 | Nishi et al. | 340/703 X |
| 4,737,772 | 4/1988 | Nishi et al. | 340/703 |
| 4,794,382 | 12/1988 | Lai et al. | 340/703 |
| 4,799,053 | 1/1989 | Van Aken et al. | 340/799 X |
| 4,800,380 | 1/1989 | Lowenthal et al. | 340/703 X |
| 4,804,948 | 2/1989 | Nishi et al. | 340/703 |
| 4,808,986 | 2/1989 | Mansfield et al. | 340/747 |
| 4,816,815 | 3/1989 | Yoshiba | 340/799 X |
| 4,823,120 | 4/1989 | Thompson et al. | 340/799 X |
| 4,837,564 | 6/1989 | Ogawa et al. | 340/799 X |
| 4,843,379 | 6/1989 | Stansfield | 340/701 |

FOREIGN PATENT DOCUMENTS 61-232492 10/1985 Japan .
61-5288 1/1986 Japan .
61-63692 3/1986 Japan .

Primary Examiner—James J. Groody
Assistant Examiner—Mark R. Powell
Attorney, Agent, or Firm—Burns, Doane, Swecker & Mathis

[57] ABSTRACT

The invention provides a novel color image display apparatus having a constitution in which a frame memory is provided between a color palette and CRT display, and the frame memory stores color image data restored by the color palette before displaying color image data on the display screen. This constitution allows the apparatus to easily composite and display image information using a variety of palette data. The apparatus is also provided with a plurality of color palettes and image-composition means which composites color images restored by a plurality of color palettes, thus making it possible for the color image display apparatus to securely compose finer color images featuring improved flexibility.

4 Claims, 4 Drawing Sheets

COLOR IMAGE DISPLAY APPARATUS WITH COLOR PALETTE BEFORE FRAME MEMORY

BACKGROUND OF THE INVENTION

1. Field of the Invention

The present invention relates to a color image display apparatus which restores original color image from compressed color image containing compressed color information.

2. Description of the Prior Art

FIG. 1 is the schematic block diagram of a conventional digital color image display apparatus. A memory means composed of floppy-disc system or optical-disc system for example stores a plurality of color image information. A memory means 1 stores compressed color image information containing color information compressed by color-compressing means described later on.

A graphic processor 2 reads compressed color image information from the memory means 1, and then, transfers the compressed image data to the frame memory 3. Simultaneously, the graphic processor 2 sets palette data as the information for restoring color in the color palette 4.

A frame memory 3 stores image data read out by the graphic processor 2 from the memory means 1 per one frame on the screen of a CRT display unit 8.

A color palette 4 restores original color image data from image data before delivering it to the CRT display unit 8, with means by palette data delivered from the graphic processor 2 and stored in frame memory 3 in accordance with information for restoring original color image from compressed color image.

By applying digital signals, any conventional digital color image display apparatus having the constitution mentioned above designates color containing picture elements needed for display, more particularly, it designates applicable colors by individually specifying luminance of threeprimary color components of light including red (R), green (G), and blue (B). On the other hand, the more the number of expressible colors, the more is the needed number of bits of digital signals designating colors. For example, to fully express 4,096 colors, a total of 12 bits (4 bits for each three-primary color components) of color information is needed for each picture element.

To compensate for this, conventionally, a technique for reducing the amount of data by compressing color information of color image is employed. For example, this technique first selects 256 units of three-primary color data mostly used for each picture, and then sets these data to color palette 4 so that these can function as palette data when displaying image. This allows color information to be expressed using 8 bits, thus effectively reducing 4-bit data from each picture element.

Normally, any conventional color image display apparatus causes the memory means 1 to store each unit of image information of a frame image by combining the image data with the palette data which is needed for restoring original color from image when displaying color image.

When displaying color image, the graphic processor 2 reads out image information from the memory means 1. Of the read-out image information, the palette data is delivered to the color palette 4 and image data to the frame memory 3, and both data are provisionally stored in the color palette 4 and the frame memory 3, respectively. The color palette 4 restores original color from image data in the frame memory 3, which are shown on the screen of the CRT display unit 8.

Because of the constitution mentioned above, any conventional color image display apparatus needs to deliver each palette data to the color palette 4 and then restores the original image color before eventually displaying each color image. Consequently, when compositing those images containing a variety of the palette data into a single image, any conventional color image display apparatus cannot restore colors of those image data composited by the frame memory by applying identical palette data. To compensate for this, any remedy means using software should be applied. However, actually, it takes a long period of time before implementing remedy means.

SUMMARY OF THE INVENTION

The primary object of the invention is to overcome those problems mentioned above by providing a novel color image display apparatus which allows palette data to easily composite a plurality of differnt images into a complete color image suited for display.

Another object of the invention is to provide a novel color image display apparatus capable of securely compositing quality color images.

The color image display apparatus related to the invention features the constitution in which a frame memory is disposed between the color palette and the display unit so that frame memory can store color image data restored into the original color by color palette before displaying complete color image on the screen of display unit. Thus, the color image display apparatus related to the invention easily composites image information containing a variety of palette data by processing the restored color image using a frame memory. The second preferred embodiment of the color image display apparatus related to the invention is provided with a plurality of color palettes and means for compositing color image data restored by each color palette. This allows the color image display apparatus related to the invention to constantly composite quality color images with improved flexibility.

The above and further objects and features of the invention will more fully be apparent from the following detailed description with accompanying drawings.

BRIEF DESCRIPTION OF THE DRAWINGS

FIG. 5 (c) is an example of image composited by image composition means and shown on the display related to the invention.

DESCRIPTION OF THE PREFERRED EMBODIMENTS

Referring now to the accompanying drawings, preferred embodiments of the color image display apparatus related to the invention are described below.

Figure 1:
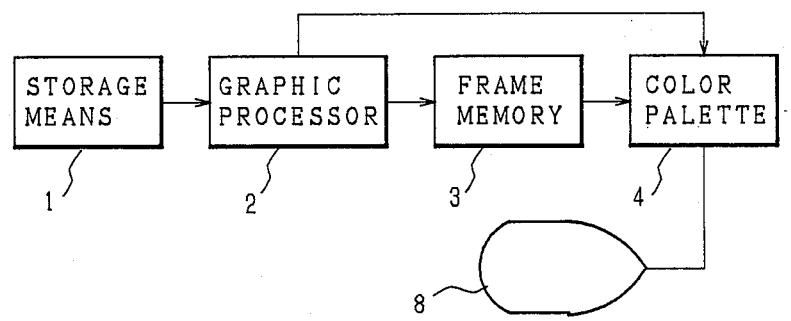
FIG. 1 is the schematic block diagram of a conventional color image display apparatus.
Figure 2:
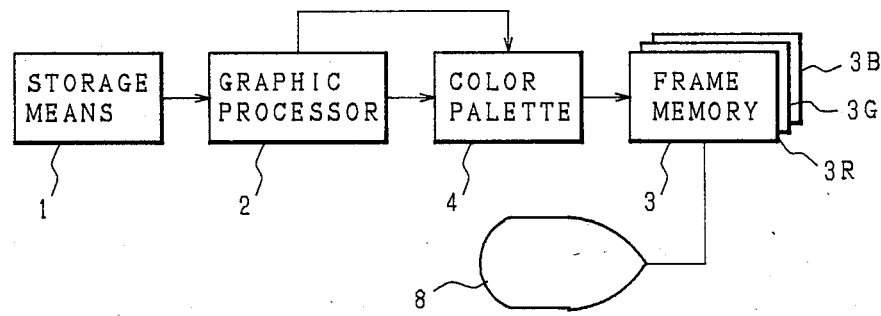
FIG. 2 is the schematic block diagram of the first preferred embodiment of the color image display apparatus related to the invention.

FIG. 2 is the schematic block diagram of the color image display apparatus related to the invention. Note that those constituents identical or corresponding to those which are shown in FIG. 1 are provided with same reference numerals.

A memory means 1 which is composed of either a floppy-disc system or an optical-disc system for example stores a plurality of color image information, more particularly, it stores those color image data whose color information is compressed by color-compressing means to be described later on.

A graphic processor 2 reads out compressed color image information from the memory means 1, and then, it sets palette data to the color palette 4 before delivering image data to the color palette 4. In accordance with palette data containing image data previously received from the graphic processor 2, the color palette 4 restores the original color image data from compressed color image information, and then delivers these data to the frame memory 3.

The frame memory 3 is composed of memories 3R, 3G, and 3B corresponding to color signals R, G, and B, while frame memory 3 stores data of the components of these three-primary colors of color image data restored by the color palette 4. Finally, a CRT display unit 8 displays complete color image data delivered from the frame memory 3.

Next, functional operation of the color image display apparatus related to the invention is described below.

First, the graphic processor 2 reads palette data of the objective compressed color image information from the memory means 1, and then, it sets these data to the color palette 4. Then, the graphic processor 2 reads image data of compressed color image information from the memory means 1, and then delivers these data to the color palette 4.

In accordance with those palette data previously set to the color palette 4, compressed image data delivered to the color palette 4 are restored into original color image data by the color palette 4 via hardware means.

Those three-primary color components including R, G, and B restored into the original color image data by the color palette 4 are then delivered to the corresponding memories 3R, 3G, and 3B of the frame memory 3 for storage. Finally, based on the image display timing, the CRT display unit 8 reads out data of three-primary color components of color image from the frame memory 3 before eventually displaying them on the CRT screen.

Figure 3:
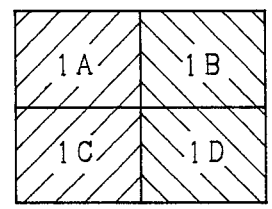
FIG. 3 is an example of pattern of image composited by image composition means and shown on the display related to the invention.

The color image display apparatus related to the invention repeatedly executes those sequential steps mentioned above for processing image information being different from each other, and then writes each color image data into different regions of the frame memory 3. This allows the color image display apparatus related to the invention to display 4 color images including IA through ID shown in FIG. 3 by compositing them into a single image on the screen of the CRT display unit 8. When compositing these with each palette data being set to the color palette 4, each of these color images IA through ID is restored. As a result, even though those palette data dealing with color images IA through ID were different from each other, these color images can properly be restored merely by applying hardware process without using software at all.

Next, the second preferred embodiment of the color image display apparatus related to the invention is described below.

Figure 4:
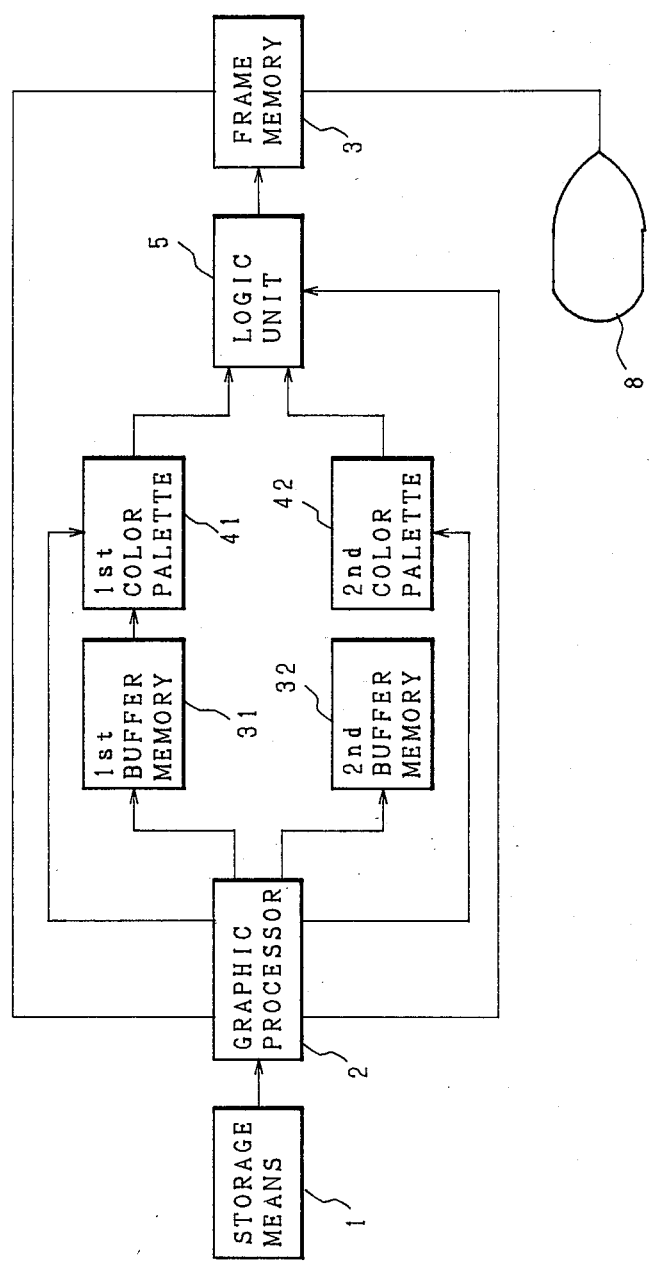
FIG. 4 is the schematic block diagram of the second preferred embodiment of the color image display apparatus related to the invention.

FIG. 4 is the schematic block diagram of the second preferred embodiment of the color image display apparatus related to the invention. It prevents a constitution which allows the color image display apparatus to simultaneously display two unit of image on the CRT screen. Note that those constituents identical or corresponding to those which are shown in FIGS. 1 and 2 related to a conventional apparatus and the first preferred embodiment of the invention are provided with identical reference numerals.

Like the first preferred embodiment, the second preferred embodiment of the color image display apparatus related to the invention is also provided with the memory means storing a plurality of compressed color image information. Likewise, the second preferred embodiment of the color image display apparatus related to the invention is also provided with the graphic processor 2. However, this graphic processor 2 is provided with specific function being different from that of the graphic processor 2 of the first preferred embodiment. It delivers two compressed color image information read out from the memory means 1 to a first buffer memory 31 and a second buffer memory 32 respectively. At the same time, it also delivers palette data of those two color image information to a first color palette 41 and a second color palette 42, respectively. These buffer memories 31 and 32 respectively store either of those two image data read from the memory means 1 by the graphic processor 2. Palette data delivered from the graphic processor 2 are respectively set to the color palettes 41 and 42. Then, in accordance with the previously-set palette data, the color palettes 41 and 42 respectively restore color information of image data stored in the buffer memories 31 and 32. After fully being restored, these image data are delivered to a logic unit 5 unit functions as image composition means. Concretely, logic unit 5 receives specific information from the graphic processor 2 in conjunction with the condition of compositing two images, for example, condition for displaying these images by superimposition, or condition for displaying each of these images in the foreground and in the background. As a result, in accordance with the image-composition information delivered from the graphic processor 2, logic unit 5 executes a variety of logical operations including calculation of OR (logical add), AND (logical product), and EX.OR (exclusive OR) with respect to the restored color image data delivered from the color palettes 41 and 42, and then, it sequentially writes in the frame memory 3.

The frame memory 3 stores those image data composited by the logic unit 5 as per one frame for display on the CRT display unit 8.

Referring now to image patterns shown in FIGS. 5 (a), (b) and (c) and the operation flowchart shown in FIG. 6, functional operation of the second preferred embodiment of the color image display apparatus is described below.

Figure 5A:
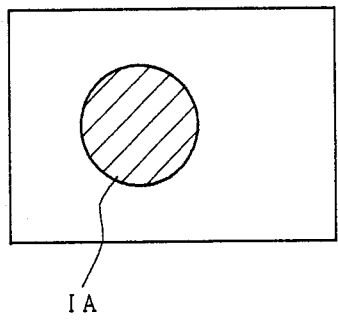
FIGS. 5 (a) and (b) are respectively examples of image patterns composited by image composition means and shown on the display related to the invention.
Figure 5B:
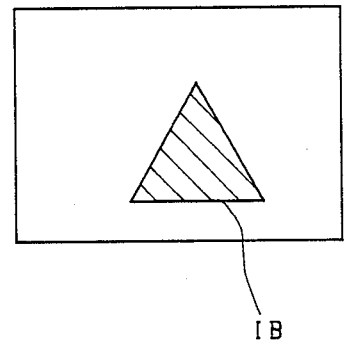
Figure 5C:
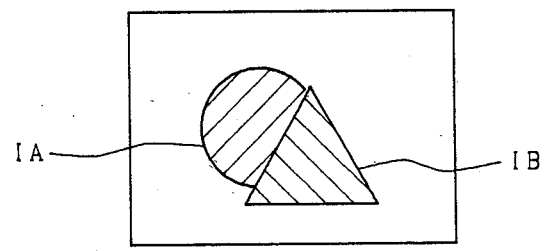
Figure 6:
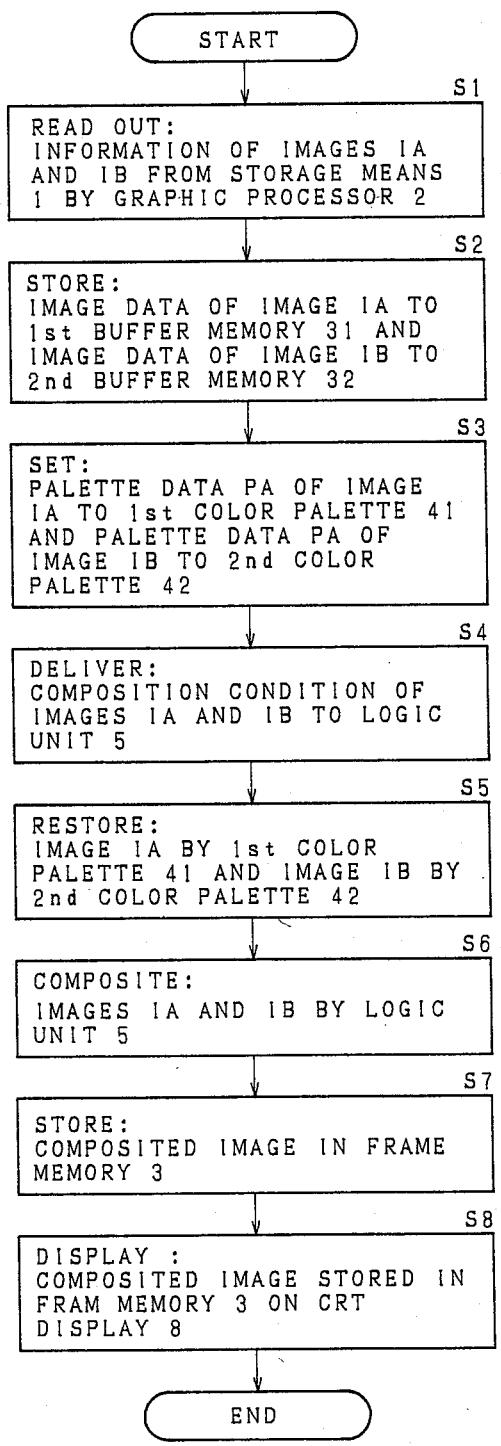
FIG. 6 is the operation flowchart of the second preferred embodiment of the color image display apparatus describing procedure for compositing and displaying complete color images.

Assume that image data of circular image IA covered with a certain color (the first color) shown in FIG. 5 (a) and image data of triangular image IB covered with the second color shown in FIG. 5 (b) constituting compressed color image information are stored in the memory means 1 together with palette data of these image data. The palette data PA restores the first color from color of image IA at the time of displaying it on th screen. Palette data PB restores the second color from color of image IB at the time of displaying it on the screen.

First, the graphic processor 2 reads out the image information of two images IA and IB from the memory means 1 while step S1 is underway. Next, when step S2 is entered, image data of image IA is delivered to the first buffer memory 31 and image data of image IB to the second buffer memory 32 for storage. Then, when steps S3 and S4 are respectively entered, the graphic processor 2 delivers the palette data PA of image IA to the first color palette 41 and the palette data PB of image IB to the second color palette 42 for entry, and simultaneously, the graphic processor 2 delivers condition for compositing images IA and IB to logic unit 5, where this condition is essential for displaying these images.

Next, when step S5 is entered, in accordance with the palette data PA of the received image IA, the first color palette 41 restores image data of image IA stored in the first buffer memory 31 into color image data, i.e., into image data of the first color as shown in FIG. 5 (a), and then, the first color palette 41 outputs the restored image data to logic unit 5.

Likewise, when step S5 is entered, in accordance with the palette data PB of the received image IB, the second color palette 42 restores image data of image IB stored in the second buffer memory 32 into color image data, i.e., into image data of the second color as shown in FIG. 5 (b), and then, the second color palette 42 outputs the restored image data to logic unit 5.

Next, when step S6 is entered, in accordance with the condition for compositing color image data previously received from the graphic processor 2, the logic unit 5 executes logical calculation with respect to the color image data delivered form the color palettes 41 and 42, and finally, logic unit 5 delivers the composited image data to the frame memory 3.

Finally, when step S7 is entered, the frame memory 3 provisionally stores the composited image data received from the logic unit 5, and then, the frame memory 3 eventually outputs the composited image data to the CRT display unit 8 in full accordance with the display timing of the CRT display unit 8. This allows the CRT display unit 8 to correctly display composited color image composed of the images IA and IB shown in FIG. 5 (c) for example.

The second preferred embodiment of the color image display apparatus related to the invention provides the buffer memories 31 and 32 between the graphic processor 2 and the color palettes 41 and 42, respectively. However, these buffer memories 31 and 32 can be deleted by specially designing data-processing means, in particular, by effectively devising data-transfer method. In addition, the second preferred embodiment provides two color palettes 41 and 42. As mentioned earlier, provision of these color palettes is to implement composition of two images to allow these images to be displayed on the CRT screen simultaneously. It should be understood that the invention does not define provision of only two color palettes, but more than two of color palettes may also be provided to allow images corresponding to the number of color palettes to simultaneously be displayed on the CRT screen.

As is clear from the above description, according to the invention, each color palette restores original color image data from compressed color image information before allowing these restored image data to be stored in frame memory. Consequently, image information having a variety of palette data can easily be composited into a single image and displayed on the CRT screen.

Furthermore, the second preferred embodiment allows the color image display apparatus to sequentially execute restoration of original color image compressed color image information using a plurality of color palettes, composition of image using image composition means, and storage of image data corresponding to each image in frame memory. Consequently, the color image display apparatus related to the invention can securely composite color image featuring finer quality and more flexibility than those of color image produced by any conventional color image display apparatus.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A color image display apparatus comprising;
   a memory means which stores image information composed of image data and palette data to be used for restoring original image from compressed color information;
   a graphic processor which reads out image information from said memory means;
   a color palette which is given image data and palette data from said graphic processor and then restores color image data from image data in accordance with palette data;
   a frame memory which stores color image data restored by said color palette; and
   a display unit which displays image data stored in said frame memory.

2. A color image display apparatus as set forth in claim 1, wherein further comprising;
   a plurality of said color palettes; and
   an image-composition means which composites color image data restored by said plurality of color palettes into one frame image and then stores composited frame image in said frame memory.

3. A color image display apparatus as set forth in claim 2, wherein said image-composition means is a logic unit which composites images by means of logical operation.

4. A color image display apparatus as set forth in claim 2, wherein each of said color palettes is provided with a buffer memory at the input side of image information.

* * * * *